United States Patent [19]
Hosmer et al.

[11] Patent Number: 5,067,214
[45] Date of Patent: Nov. 26, 1991

[54] TENTER FRAME APPARATUS AND METHOD

[75] Inventors: Christopher E. Hosmer, Taylors, S.C.; John F. Whaley, Warwick, R.I.

[73] Assignee: Marshall and Williams Company, Providence, R.I.

[21] Appl. No.: 527,015

[22] Filed: May 22, 1990

Related U.S. Application Data

[63] Continuation-in-part of Ser. No. 244,300, Sep. 15, 1988, Pat. No. 4,926,529.

[51] Int. Cl.⁵ .............................................. D06C 3/04
[52] U.S. Cl. ..................................... 26/89; 384/297
[58] Field of Search ............. 26/89; 242/118.61; 384/43, 299, 125, 300, 297, 121, 94, 30; 92/84; 192/105 CD

[56] References Cited

U.S. PATENT DOCUMENTS

| | | | |
|---|---|---|---|
| 3,022,128 | 2/1962 | Reuter | 384/125 |
| 3,650,494 | 3/1972 | Hutchinson | 242/118.61 |
| 3,813,133 | 5/1974 | Walter et al. | 384/121 |
| 4,401,198 | 8/1983 | Kunczynski | 384/297 X |
| 4,678,349 | 7/1987 | Yoshigai | 384/297 X |
| 4,926,529 | 5/1990 | Hosmer et al. | 26/89 |
| 4,932,795 | 6/1990 | Guinn | 384/297 X |
| 4,949,438 | 8/1990 | Richter | 26/93 X |

FOREIGN PATENT DOCUMENTS

| | | | |
|---|---|---|---|
| 0606025 | 9/1960 | Canada | 384/299 |
| 0945300 | 12/1963 | United Kingdom | 384/300 |
| 1388116 | 3/1975 | United Kingdom | 384/299 |

*Primary Examiner*—Werner H. Schroeder
*Assistant Examiner*—John J. Calvert
*Attorney, Agent, or Firm*—Bailey & Hardaway

[57] ABSTRACT

A tenter frame is illustrated wherein a chain is fabricated by press fitting a pin receiving bushing constructed of Vespel and the like into a steel bushing and then boring a pin receiving opening therein and utilizing wear strips constructed of Vespel in a dovetail configuration opposite the tenter chain providing a lubrication free tenter wherein the chain may be tensioned without excessive stretching. Also illustrated are lubrication-free tenter-clip jaw pivot bushings.

1 Claim, 5 Drawing Sheets

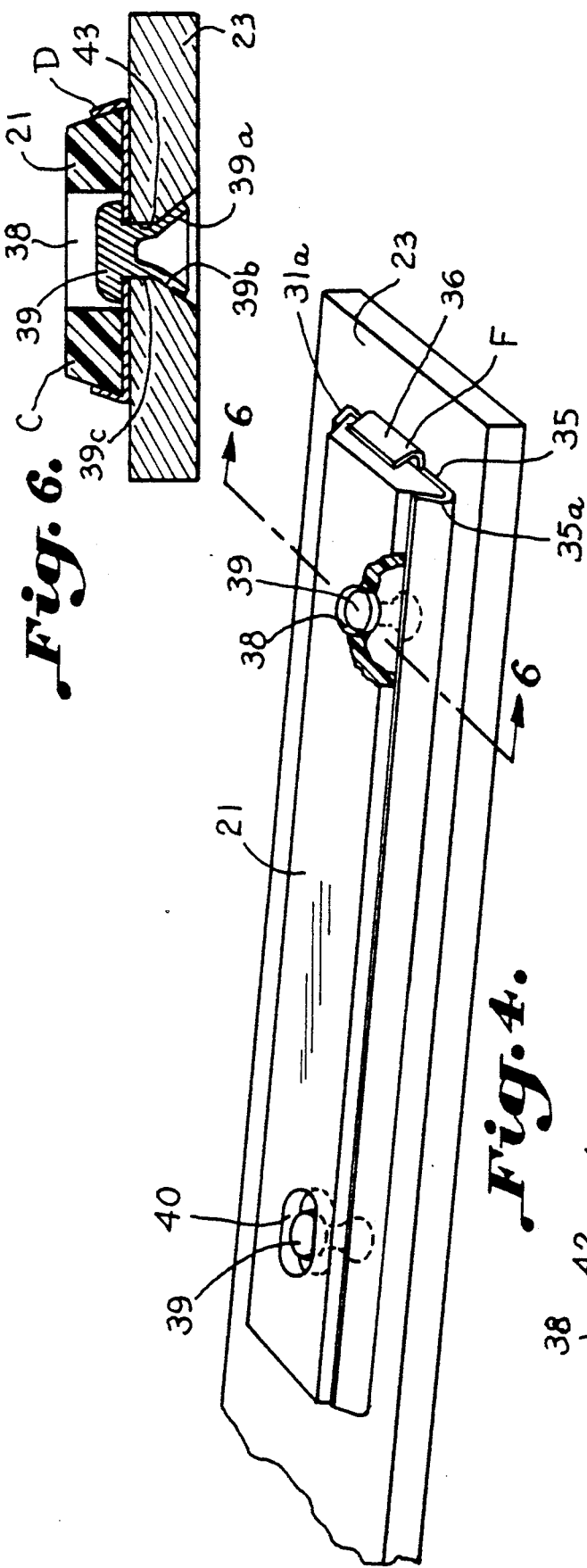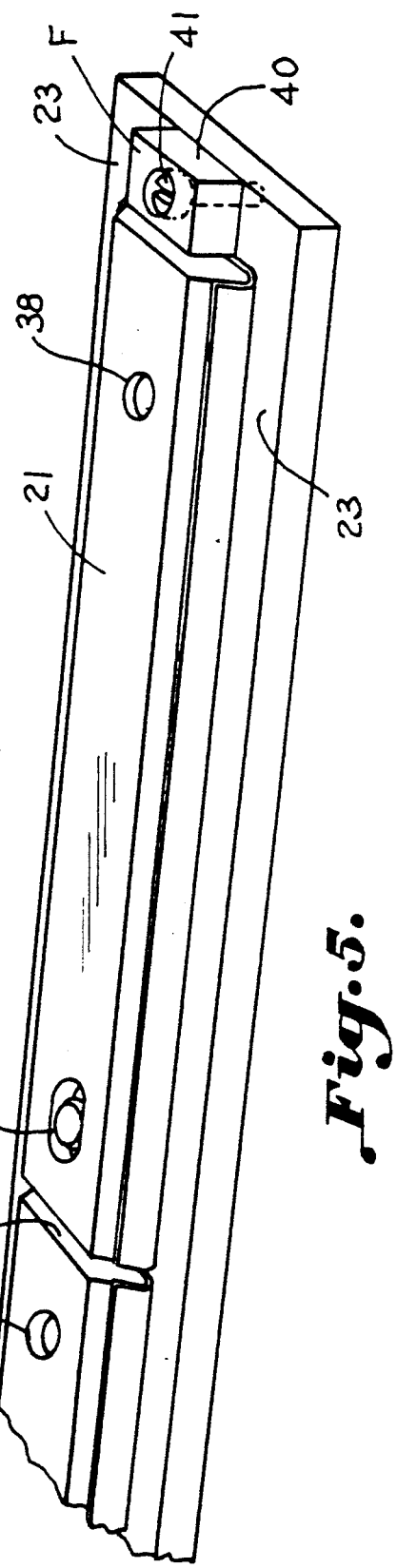

TENTER FRAME APPARATUS AND METHOD

This application is a Continuation-in-part of Hosmer, et al. application Ser. No. 07/244,300, filed Sep. 15, 1988 now U.S. Pat. No. 4,926,529.

BACKGROUND O HE INVENTION

This invention, relates to the provisions of a lubrication free tenter chain and tenter. Elimination of lubrication to the chain pins and rollers of a tenter chain and to the tenter jaw pivot will greatly reduce the quantity of oil required to be put onto the tenter chain or jaw pivot, thereby greatly reducing the chance of oil being thrown off or splattered onto the cloth. A self-lubricating bushing liner or bushing can be used in place of oil lubrication, but it must be able to withstand temperatures of up to 450° F. with very high pressure loading caused by the chain tension and have a low wear rate. At present a Teflon-type of material has been used successfully in certain low tension types of tenter chains but these wear excessively in standard types of tenter chains where tension is higher. Metallic bushings have been used in tenter jaw pivots to extend the useful life of the tenter, but these metal bushings require oil lubrication.

Accordingly, it is an important object of this invention to provide a tenter chain having a bushing liner constructed of low friction wear resistant plastic material stable at high ambient temperatures which will be of minimal thickness so that compression thereof does not result in excessive stretching of the tenter chain when under such tension as occurs during normal operation.

Another important object of the invention is the provision of wear strips constructed of Vespel and the like which may be suitably mounted so as to confine the material in case of breakage and to avoid shattering of the material. Vespel is a registered trademark of the E.I. Dupont de Nemours Company used to describe parts which are made from Dupont's polyimide resin.

Still another important object of the invention is the provision of a dovetail mounting and/or the employment of countersunk rivets so as to provide a lubrication free tenter chain while avoiding contamination with provision for thermal expansion of the wear strips and the like.

It is also an important object of the invention to provide a self-lubricating bushing for the tenter clip jaw pivot.

SUMMARY OF THE INVENTION

The high temperature capability and high bearing load characteristics of Dupont's Vespel material make it a desirable material for a self-lubricating bushing. Preferably, Vespel SP-21 and SP-211 is utilized for wear strips and in the structures illustrated herein. Vespel is a polyimide resin suitable for use herein and is available in solid shapes for machining or it can be molded into shapes by a process similar to powder metallurgy. The high price of solid stock material makes machining parts from it not practical for tenter clip or tenter chain parts. The price of the molded parts is much less, but molded parts cannot be made with as thin a wall section as a tenter clip or tenter chain bushing liner requires.

Reasons for a thin wall bushing include:
(1) Space requirements;
(2) The thinner wall the bushing liner has, the less compressibility and hence stretch will be imparted to the chain when under tension and structural integrity of the tenter clip jaw pivot is improved;
(3) Approximately 0.010" of wear is allowable, so extra thickness would be of no use except to add cost to the part.

The method includes molding a part into as thin a wall as possible, then pressing it into the steel chain bushing and boring it out to final size while press fitted into the bushing. When utilized as a bushing for a tenter clip jaw pivot, the material may be pressed directly into the tenter clip frame or upper jaw and bored to final size to accommodate the jaw pivot pin or the material may be pressed into a steel bushing as a liner and similarly bored, the steel bushing and liner then together serving as the bushing.

High pressure and high speed operation of unlubricated soft steel plates sliding on Vespel SP-21 or SP-211 material will result in wear on the steel plate, which, due to a roughening surface finish on the plates, causes a rapid wear rate of the Vespel. Therefore, the steel surfaces must be hardened and be as smooth and flat as possible. With surfaces flat to a 16 RMS finish and case hardened file hard, there is little wear on steel plates and minimal wear on the Vespel.

By utilizing a mounting having a dovetail configuration with complementary cross section of the Vespel, it is possible to minimize machining and thickness of the Vespel while protecting same against breaking due to the inherent brittleness of the material and retining such material if it is broken. Preferably the Vespel is carried across a machined dovetail slot in the side, top and bottom casings as illustrated in the drawings within a mounting clip constructed of sheet metal material bent into a dovetail configuration as it also illustrated.

Suitable fastenings for the dovetail strips within the mounting clip include an abutment carried at one end so that successive strips may be placed bearing against the abutment and each other in end to end relation with the direction of travel of the chain tending to urge the strips towards the abutment. It is preferable to utilize a fixed fastening for one end of each strip while the other end of the strip is provided with a slotted fastening which may compensate for expansion and contraction due to temperature variations. Preferably, tubular rivets are utilized as illustrated. Such rivets lend themselves to being flared with a countersunk hole in the slide casing so that no extra clearance is required for the rivet heads and there is no danger of rivet heads being sheared off by moving parts. Since the rivets are countersunk, collection of extraneous material on the tenter frames as may contaminate them and the material being treated is avoided. This construction possesses advantages over the use of threaded fasteners which can back out due to vibration and can be difficult to remove after long periods in a harsh environment.

Reference is made to application Ser. No. 07/221,014 in the name of Richter filed July 15, 1988 now U.S. Pat. No. 4,949,438, the disclosure of which is incorporated herein by reference.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 4 is a perspective view illustrating a wear strip constructed in accordance with the present invention;

FIG. 5 is a perspective view illustrating a mounting for a wear strip constructed in accordance with a modified form of the invention;

FIG. 6 is a transverse sectional elevation taken on the line 6—6 in FIG. 4;

DESCRIPTION OF A PREFERRED EMBODIMENT

A lubrication free tenter chain having a pin and steel bushing carried thereon includes a press fitted molded bushing liner A constructed of low friction wear resistant plastic material stable at high temperatures in the steel bushing. An axial bore B in the bushing liner is machined therein while the bushing liner is press fitted into the steel bushing increasing the size of the opening in said liner to accommodate the pin and minimize the thickness of the liner. Thus, breakage of the bushing inner during boring is avoided while minimized thickness thereof reduces stretching of the chain due to compression of the liner resulting from tensioning of the chain. The chain rollers have a similar liner construction. Low friction wear resistant plastic lubrication free wear strips C stable at high temperatures are mounted in end to end relationship opposite the chains. A longitudinal dovetail mounting D supports the strips along a back portion and at upper and lower edges providing said strips with a forwardly projecting wear portion for sliding contact by said chain. A wear plate E carried by the chain has ground hardened steel surfaces engaging the wear portion of the strips for sliding movement during operation of the tenter chain.

An abutment F is provided at one end of the dovetail mounting restraining a wear strip within a machined dovetail mounting and additional wear strips are inserted into the dovetail mounting in the direction of movement of the chain when in operation. Alternatively, one end of each of the wear strips may be fixed and a slotted fastening provided at the other end of each of the wear strips with the wear strips being in spaced relationship to each other to provide for longitudinal thermal expansion. The dovetail mountings may be constructed of sheet metal with inwardly converging upper and lower flanges. Countersunk pop rivets are provided for fixing the one end and fastening at the other end of each wear strip.

Figure 1:
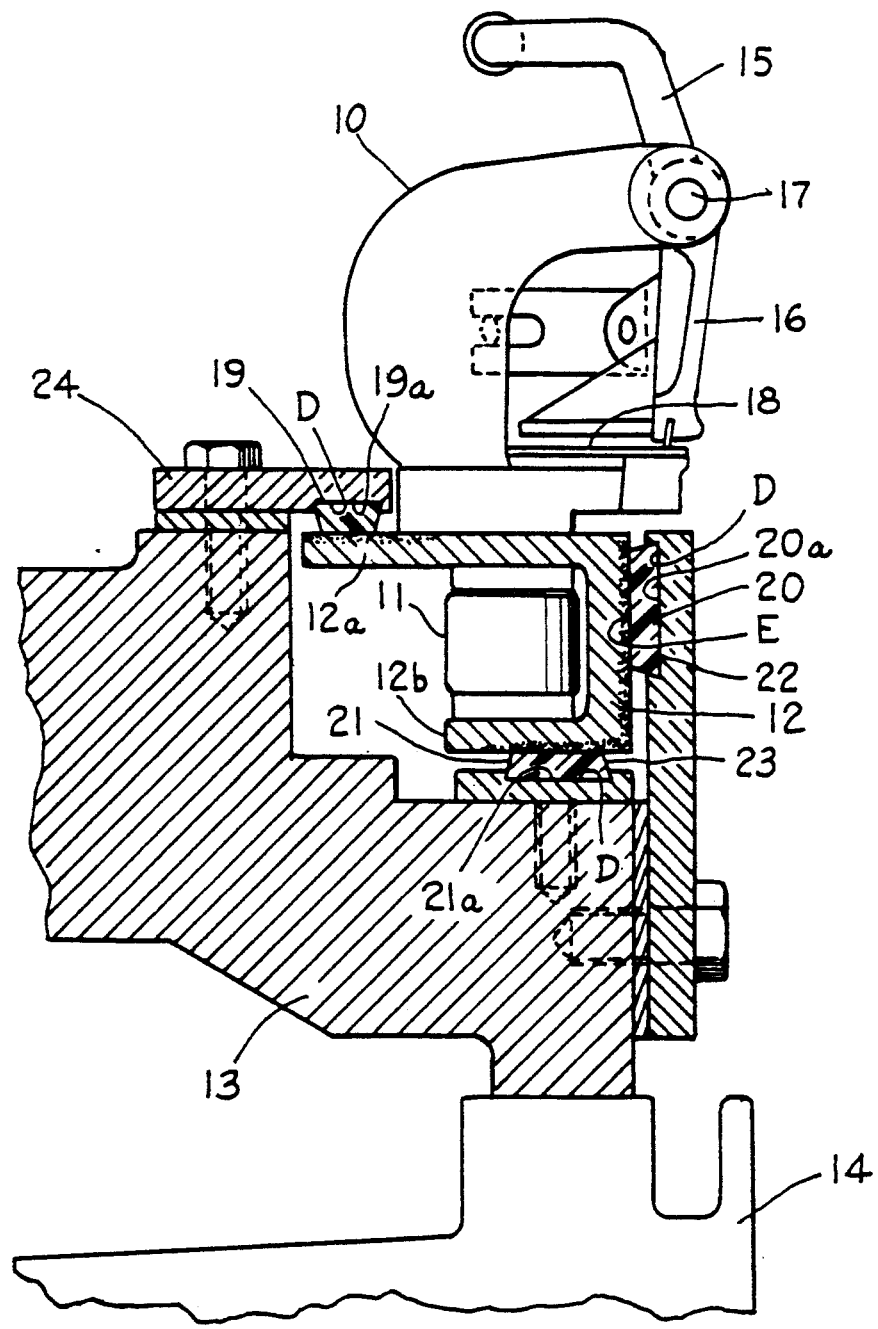
FIG. 1 is a transverse sectional elevation taken across a rail of a tenter frame illustrating wear strips constructed in accordance with the present invention.
Figure 2:
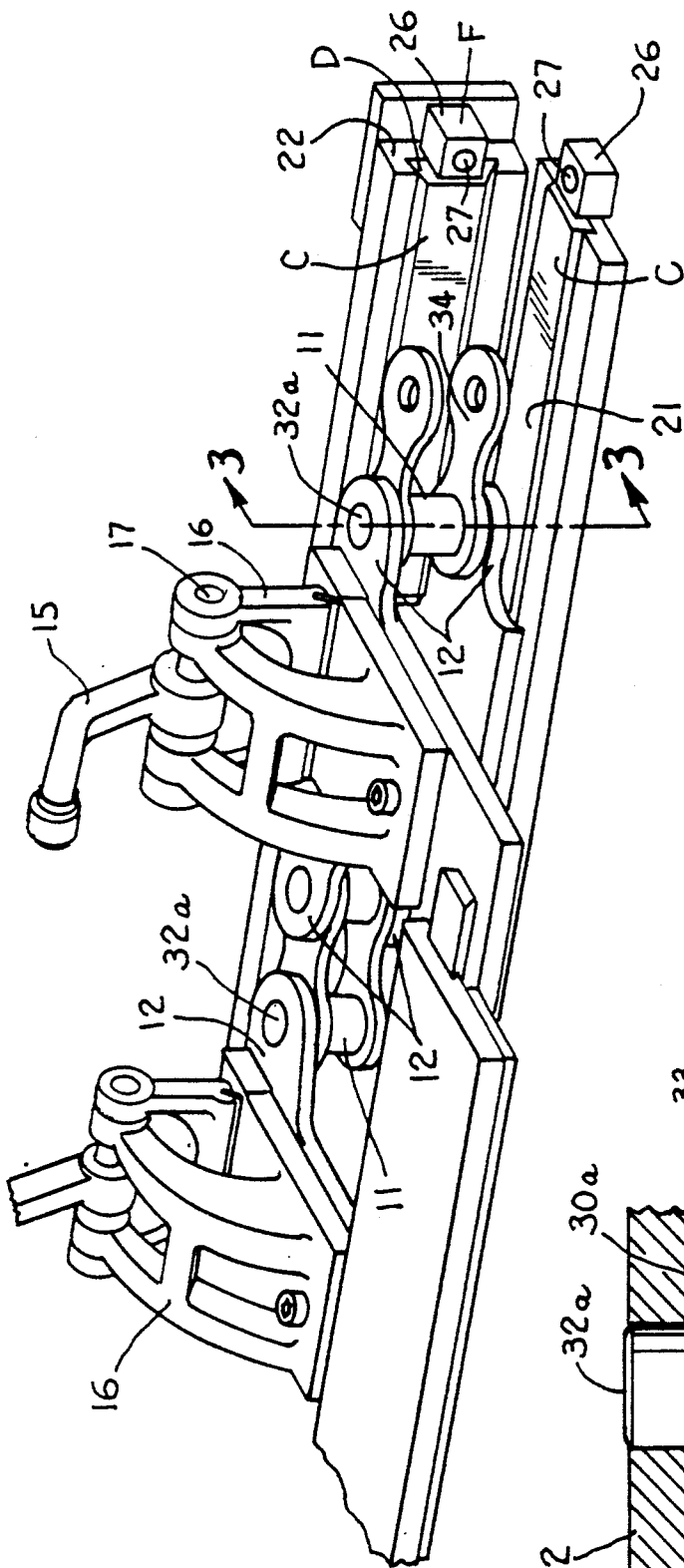
FIG. 2 is a perspective view further illustrating a wear strip constructed in accordance with the invention.

Referring more particularly to the drawings, a rail for carrying a tenter clip having a C-shaped frame 10 is illustrated. The tenter clip is carried by a chain having a roller designed at 11. A slide plate 12 has upper and lower connectors 12a and 12b respectively. The rail 13 is carried by the usual frame 14. A tenter clip includes the usual lever 15 for actuating the movable upper jaw 16 pivoted by pin 17 on a free upper end of the C-shaped frame member 10. The lower jaw is fixed as is illustrated at 18. In FIGS. 1 and 2 Vespel wear strips are illustrated in dovetail configuration as at 19, 20 and 21 being positioned in the side, bottom and top casings 22, 23 and 24 respectively. It will be noted that dovetail slots 19a, 20a and 21a respectively are provided for positioning the Vespel wear strips. The Vespel wear strip 19 is provided opposite the connector 12a.

In FIG. 2 abutments 26 are suitably secured as by screws 27 so as to confine the respective wear strips within the dovetail mountings. The direction of movement of the chain and tenter clips is illustrated by the arrow in FIG. 2.

Figure 3:
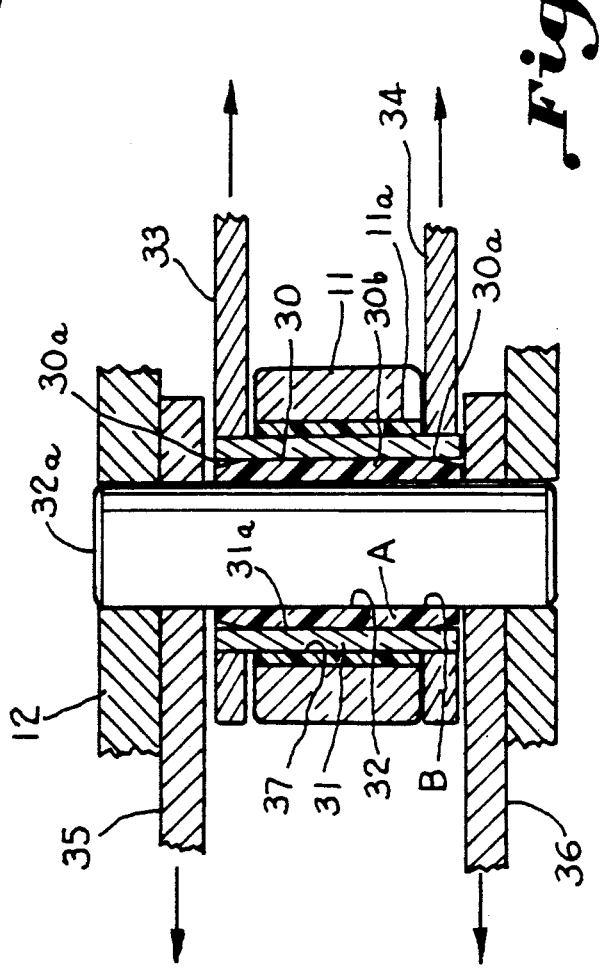
FIG. 3 is a sectional elevation illustrating a bushing liner utilizing a lubrication free tenter chain constructed in accordance with the invention.

FIG. 3 illustrates a liner A which is constructed of molded Vespel and the like illustrated at 30. The liner has tapered end portions as illustrated at 30a adjacent each outer end with a cylindrical portion 30b therebetween. The liner is carried in a suitable steel bushing 31 which has an opening 31a to receive the liner 30. The opening within the liner is illustrated at 32 and is placed therein by boring after the liner sleeve is press fitted into the bushing. The roller 11 has a molded Vespel liner 11a constructed in an identical manner as the bushing. It is important that the boring occur in both the liners A and 11a to enlarge the openings already in the respective liners while being supported within the bushing and the rollers 11 respectively so a to prevent shattering of the brittle Vespel material. It is important that the Vespel material be of minimal thickness to provide for critical wear while avoiding excessive stretching or elasticity of the chain due to the fact that the Vespel is somewhat compressible a compared to steel. The chain has links 33 and 34 which are illustrated as being in tension as well as outside links 35 and 36 all of which engage the pin 32a. A roller is illustrated at 37 for confinement within the connectors 12a.

The wear strips C illustrated in FIG. 2 are carried within a dovetail confinement on mounting D which has been machined in the form of a dovetail slot within the respective casings.

FIG. 4 illustrates a mounting clip 35 formed by a sheet material member for converging flanges 35a joined by a web member 35b. A tab 36 is struck up at the end of the casing to provide confinement for the respective strips 21. The strips ar provided with a fixed fastening including circular hole 38 to accommodate a rivet 39 at one end while a slot 40 is provided at the other end to accommodate the rivet 39.

In FIG. 5 an abutment 40 is illustrated as being secured above a screw 41 in an end to confine the wear strip 21 within the mounting. A space is illustrated at 42 between strips in FIG. 5. The rivet is illustrated in FIG. 6 which includes a head 39 and a flared base 39a carried within a flared opening portion 39b into casing 23. The casing has an opening 43 in the face thereof for accommodating the shank portion 39c of the rivet.

Figure 7:
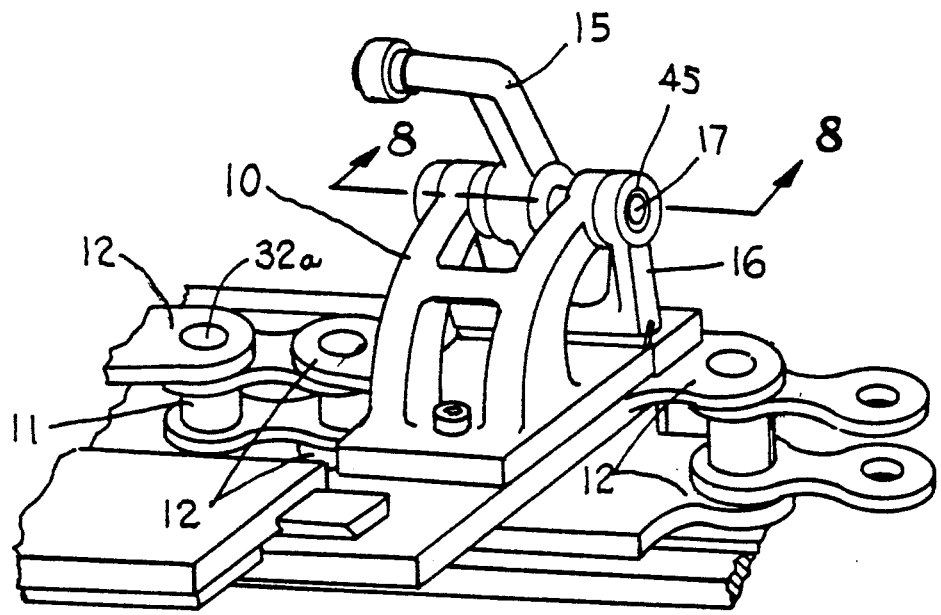
FIG. 7 is a perspective view illustrating the placement of a tenter clip jaw pivot bushing.
Figure 8:
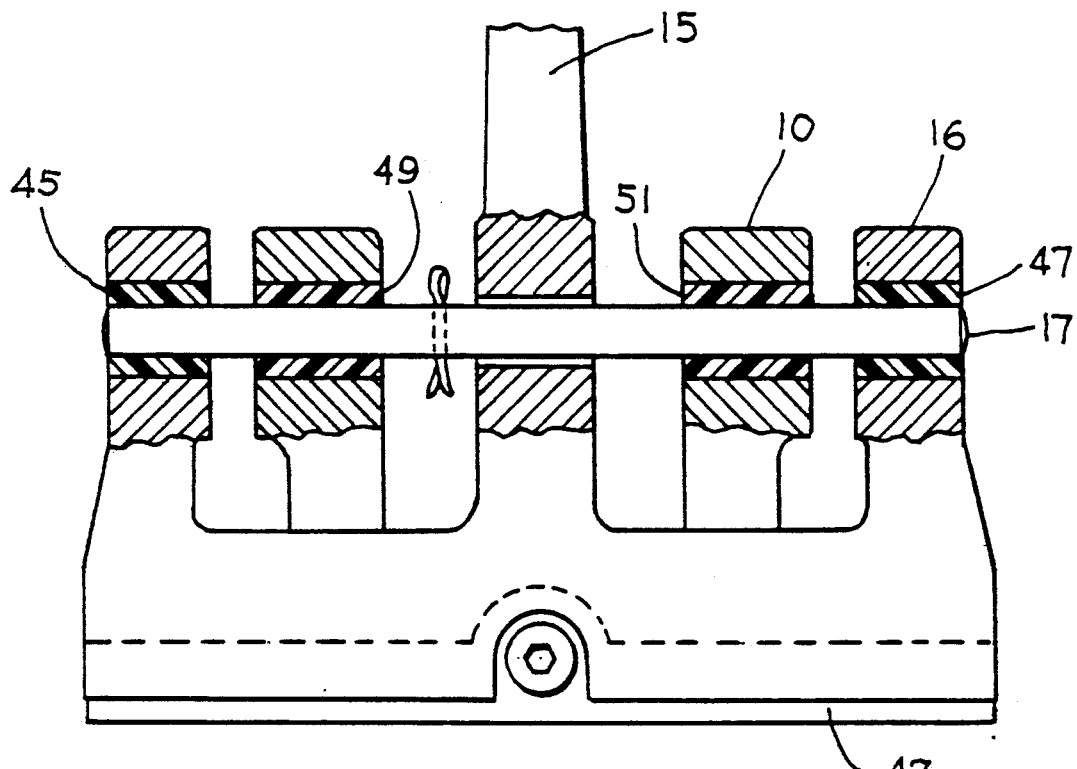
FIG. 8 is a sectional front elevation along the line 8—8 in FIG. 7.
Figure 9:
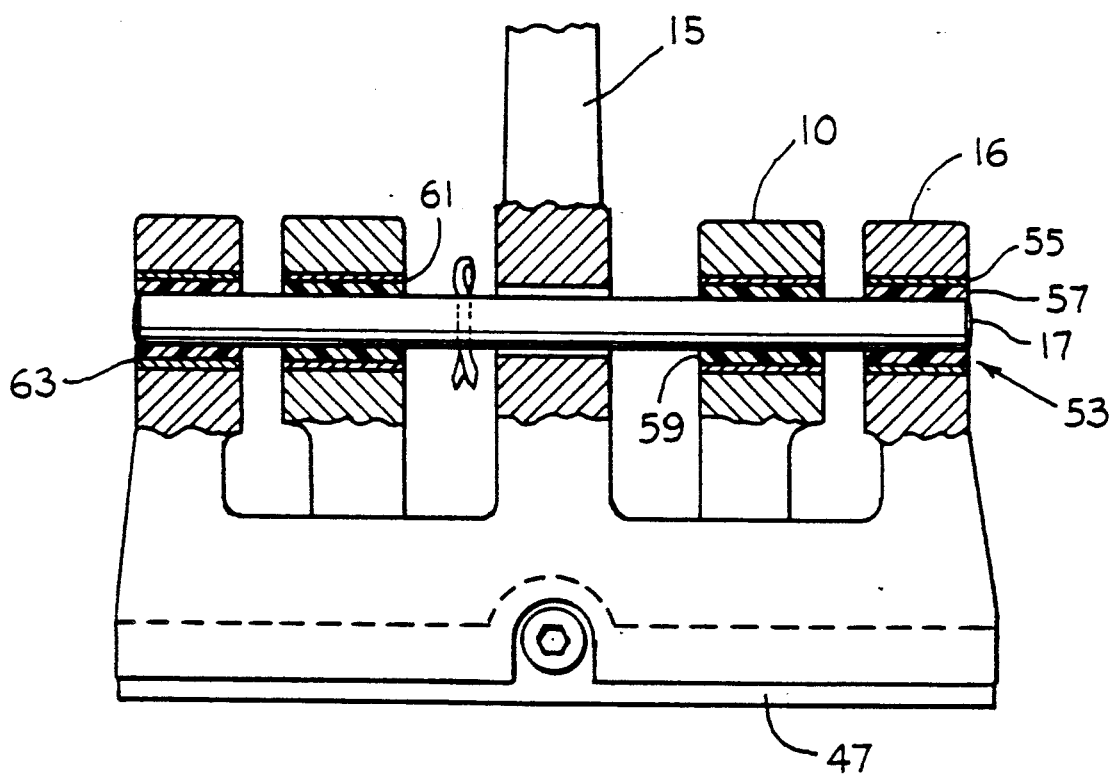

FIGS. 7 and 8 illustrate the use of a Vespel insert in relation to the movable jaw of tenter clip. The beneficial results obtainable when bushings ar used in the tenter jaw pivot of a tenter clip were recognized in the aforementioned application Ser. No. 07/221,014, now U.S. Pat. No. 4,949,438. The primary advantages of the use of bushings in the application illustrated in FIGS. 7 and 8 are to reduce maintenance and extend the useful life of the clip. The present invention eliminates the previous lubrication requirements.

The relationship of a jaw pivot bushing 45 to the upper jaw 16 and pin 7 is illustrated in FIG. 7. As seen in FIG. 8, pin 17 extends transversely of upper jaw 16. Note that four bushings are required. Outer bushings 45 and 47 are mounted within upper jaw 16. Inner bushings 49 and 51 are mounted within frame 10. The bushings 45, 47, 49 and 51 are fabricated by press fitting a molded piece of the low friction wear resistant plastic material into its respective supporting member (upper jaw 16 or frame 10) and then axially boring the bushing, as discussed previously, to accommodate the pin 17.

It is thus seen that a lubrication free tenter frame has been provided utilizing essentially sleeve constructed of thin Vespel sleeves and the like to limit stretching of the chain together with the dovetail Vespel strips. The chain is fabricated utilizing a steel bushing wherein the sleeve is press fitted therein prior to boring a hole therein to accommodate the pins of the tenter chain. The dovetail mountings may be provided by machining of the casings, or a clip utilizing bent sheet metal having inward converging flanges may be utilized.

Also provided ar lubrication-free bushings for the tenter clip jaw. The bushings may be formed completely of Vespel and the like, or may be formed of metallic bushings with liners of Vespel or a similar material. The process of the invention allows minimal bushing thickness to be realized, contributing to the overall structural integrity of the tenter clip.

While a preferred embodiment of the invention has been described using specific terms, such description is for illustrative purposes only, and it is to be understood that changes and variations may be made without departing from the spirit or scope of the followings claims.

What is claimed is:

1. A lubrication free tenter clip having a supporting member for processing sheet material comprising:
   mold bushings constructed of low friction wear resistant polyimide resin press fitted into a bore defined by a supporting member;
   said bushings having been axially bored while press fitted to increase the size of an opening in said bushings to accommodate a pin and minimize the thickness of he bushings;
   whereby breakage of he bushings during boring is avoided while the bushing thickness is minimal.

* * * * *